US011618517B2

(12) United States Patent
Calia et al.

(10) Patent No.: US 11,618,517 B2
(45) Date of Patent: Apr. 4, 2023

(54) CONNECTION ASSEMBLY FOR ARTICULATED CHAINS

(71) Applicant: ITALTRACTOR ITM S.P.A., Fraz. Calcara di Crespellan (IT)

(72) Inventors: Eustachio Calia, Matera (IT); Hans Juergen Holger Humbek, Bochum (DE)

(73) Assignee: ITALTRACTOR ITM S.P.A., Bologna (IT)

(*) Notice: Subject to any disclaimer, the term of this patent is extended or adjusted under 35 U.S.C. 154(b) by 388 days.

(21) Appl. No.: 16/767,024

(22) PCT Filed: Nov. 27, 2017

(86) PCT No.: PCT/IT2017/000269
§ 371 (c)(1),
(2) Date: May 26, 2020

(87) PCT Pub. No.: WO2019/102503
PCT Pub. Date: May 31, 2019

(65) Prior Publication Data
US 2020/0324838 A1 Oct. 15, 2020

(51) Int. Cl.
*B62D 55/21* (2006.01)
*B62D 55/32* (2006.01)

(52) U.S. Cl.
CPC .......... *B62D 55/213* (2013.01); *B62D 55/32* (2013.01)

(58) Field of Classification Search
CPC ....... B62D 55/21; B62D 55/213; B62D 55/32
USPC ........................................ 305/186
See application file for complete search history.

(56) References Cited

U.S. PATENT DOCUMENTS

| 3,169,039 A | 2/1965 | Baker et al. |
| 9,630,665 B2* | 4/2017 | Kita ................. B62D 55/213 |
| 2016/0221619 A1 | 8/2016 | Kita |

FOREIGN PATENT DOCUMENTS

| JP | S55107492 U | 7/1980 |
| JP | S641078 U | 1/1989 |
| JP | H8-295268 A | 11/1996 |
| JP | 2012107682 A | 6/2012 |

OTHER PUBLICATIONS

Japan Office Action dated Aug. 24, 2021, issued in corresponding Japanese application.

* cited by examiner

Primary Examiner — Lars A Olson
(74) Attorney, Agent, or Firm — Husch Blackwell LLP

(57) ABSTRACT

A connection assembly for articulated chains which comprise mutually-pivoted links that are split between at least one initial link and at least one terminal link. The assembly comprises transverse holes of the initial link and of the terminal link, which are arranged in mutual alignment when the initial and terminal links are in the coupling configuration; a master pin, with shape and dimensions substantially complementary to those of the holes and adapted to be inserted into those holes in order to couple the initial and terminal links; at least one elastic peg that can be accommodated, with elastic forcing thereof, in at least one respective radial channel which is defined, in its outermost parts, on at least one link chosen from between the initial link and the terminal link and, in its innermost part, on the master pin.

13 Claims, 4 Drawing Sheets

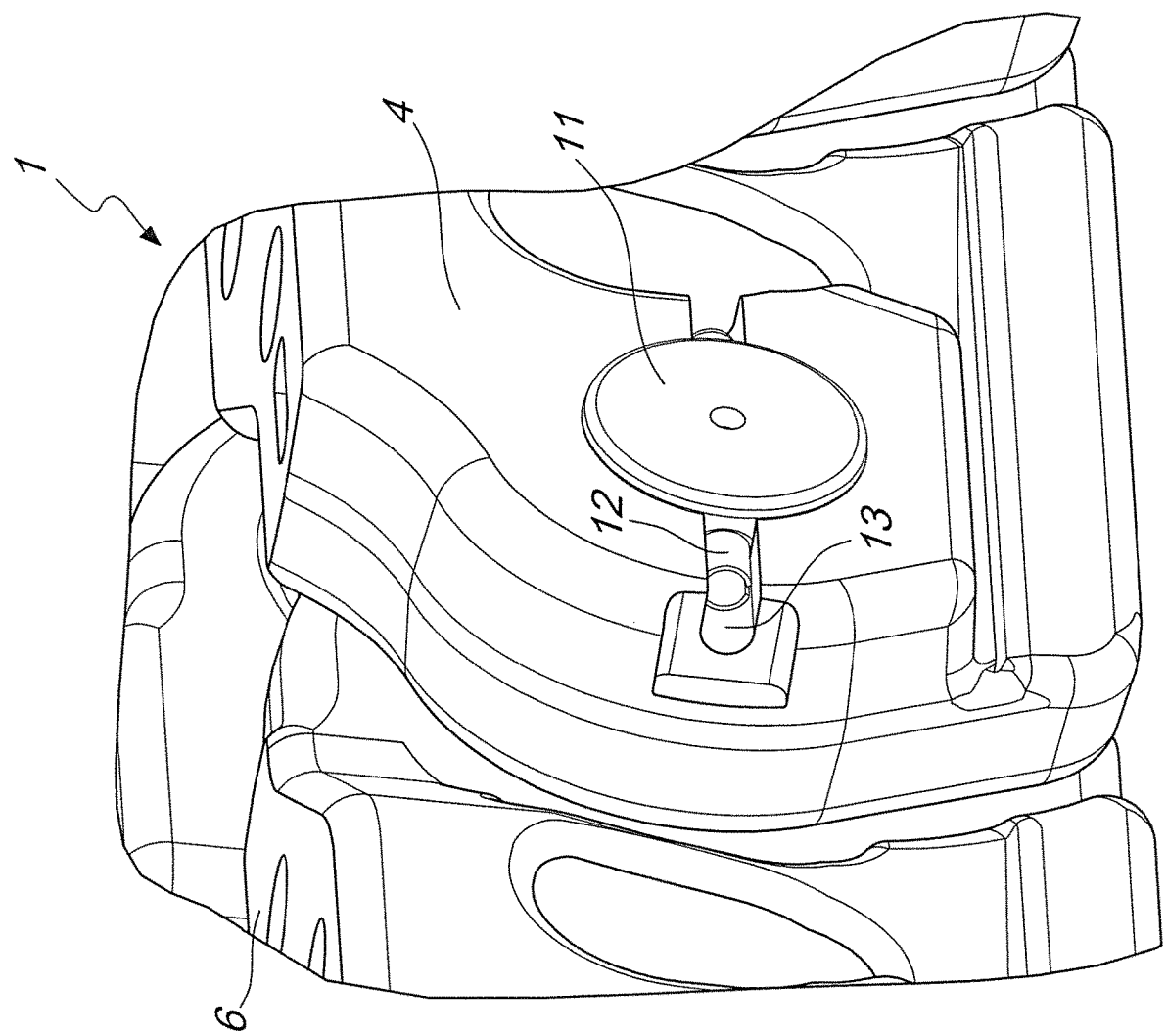

CONNECTION ASSEMBLY FOR ARTICULATED CHAINS

CROSS REFERENCE TO RELATED APPLICATIONS

This application is a U.S. National Phase Application of International Application No. PCT/IT2017/000269 filed on Nov. 27, 2017. The disclosure of International Application No. PCT/IT2017/000269 is incorporated herein by reference.

The present invention relates to a connection assembly for articulated chains, in particular for the chains of crawler tracks.

Works vehicles, designed for earth-moving, and some special vehicles make use of crawler tracks instead of wheels.

Briefly, a conventional chain for providing crawler tracks is composed of a plurality of articulated joints that can rotate with respect to each other, thus giving the chain the characteristic of assuming a closed shape. A joint is constituted by mutually-opposing pairs of links that are provided with aligned transverse holes; two pairs of links are articulated to each other by way of a bushing that accommodates a coupling pin.

The coupling pin is usually coupled rigidly to the links, which are located outside the joint, while it is freely able to rotate inside the bushing.

Other coupling methods are also known which enable the mutual rotation between the first and the second pair of links (although they are based on the same principle).

The rigid coupling between the pin and the respective holes in the outer links is generally obtained by interference fit: in essence the pin is inserted into the link using a high-power press or by taking advantage of thermal dilation/contraction of the components involved.

In this manner two joints are coupled to each other while retaining the capacity to rotate with respect to each other. By repeating such assembly operations, a plurality of mutually-coupled joints is produced which form overall a chain. Such links support substantially flat elements (known in the sector as "pads") for contact with the ground, which are generally coupled to a joint of the chain by way of threaded elements.

In operation, this chain is mounted on the works vehicle, forming a continuous structure: to this end the articulated chain for providing crawler tracks is closed upon itself, forming a continuous structure with a closed shape, wound between two wheels arranged at a determined center distance.

In the current state of the art, closing a chain is done, typically, using two conventional techniques: the master pin or the master split link.

The master pin technique can be divided into two types, respectively called "press fit" and "solid pin".

In the press fit technique, a master pin is inserted between the holes in the links of the first joint and the hole inside the bushing of the last joint; such pin is inserted with interference into the holes of the links. By virtue of interference, such method is capable of canceling out any relative movement between the pin and the links, but it requires a hydraulic press in the assembly step, making it difficult to carry out such operation on-site: obviously the difficulty of such operation increases proportionally with the dimensions of the chain, since with the dimensions the forces necessary for inserting the pins increase, and therefore the dimensions and weight of the press increase.

The current state of the art for the solid pin technique offers several different construction variants: axial locking in place by way of split pins; axial locking in place by way of C-clip elastic stop rings (of the type called Seeger).

In the solid pin technique, the master pin is free to pass through the holes of the links by virtue of a mechanical coupling with play, and such master pin is then axially locked in place, on one side by way of a peg or an elastic ring, while on the other side it is locked in place by an abutment shoulder with a diameter larger than the base diameter of the pin. The abutment shoulder is in contact with the surface of the link, thus preventing the axial movement of the master pin (in some cases, instead of the abutment shoulder, the end zones of the pin are made with an increased diameter).

This method has the advantage of not requiring hydraulic presses or dedicated tools, but it has the disadvantage of not being able to completely cancel out the play between the master pin and the corresponding accommodation holes provided in the two links. The possibility of very small movements between the master pin and the links can be a cause of damage to the components proper and of consequent reduction of the lifetime of the chain (small movements can result in wear of the components, with a progressive increase of play until damage arises that can result in a machine breakdown).

Some master split links are adopted preferably in lubricated chains in which it is necessary to have all the joints that form the chain in lubricated conditions: in particular such condition relates to master split links that are constituted by two half-links which are mutually and rigidly coupled by way of screws.

Such system has several advantages: firstly it also ensures correct lubrication of the chain connecting element, and furthermore it does not require expensive equipment for affixing on-site.

Unfortunately this embodiment implies some drawbacks compared to coupling using a master pin: in fact, since each link is made up of two parts, it requires a different production process from a normal link and therefore it is very expensive. For this reason its use is justified only on lubricated chains intended for dynamic applications (bulldozers). In heavy applications (for example in mining) such master split links are a weak point of the chain, and are often subject to structural breakage.

The aim of the present invention is to solve the above mentioned drawbacks, by providing a connection assembly for articulated chains that can be easily fitted without necessitating dedicated machines (such as high-power presses and the like).

Within this aim, an object of the invention is to provide a connection assembly for articulated chains in which the axial plays of the couplings are minimized, with consequent reduction of wear.

Another object of the invention is to provide a connection assembly for articulated chains that is low cost.

Another object of the invention is to provide a connection assembly for articulated chains that is adapted to be adopted on works vehicles of any kind and used in any environment.

A still further object of the present invention is to provide a connection assembly for articulated chains which is low cost, easily and practically implemented, and safe in use.

This aim and these and other objects which will become better apparent hereinafter are achieved by a connection assembly for articulated chains which comprise mutually-pivoted links that are defined between at least one initial link and at least one terminal link, characterized in that it comprises:

transverse holes of said initial link and said terminal link, which are arranged in mutual alignment when said initial and terminal links are in the coupling configuration, a master pin, with shape and dimensions substantially complementary to those of said holes and adapted to be inserted into said holes in order to couple said initial and terminal links, at least one elastic peg that can be accommodated, with elastic forcing thereof, in at least one respective radial channel which is defined, in its outermost parts, on at least one link chosen from between said initial link and said terminal link and, in its innermost part, on said master pin.

Further characteristics and advantages of the invention will become better apparent from the detailed description that follows of a preferred, but not exclusive, embodiment of the connection assembly for articulated chains according to the invention, which is illustrated by way of non-limiting example in the accompanying drawings, wherein:

FIG. 4 is a perspective view of a detail of an additional variation of the connection assembly for articulated chains according to the invention.

Figure 1:
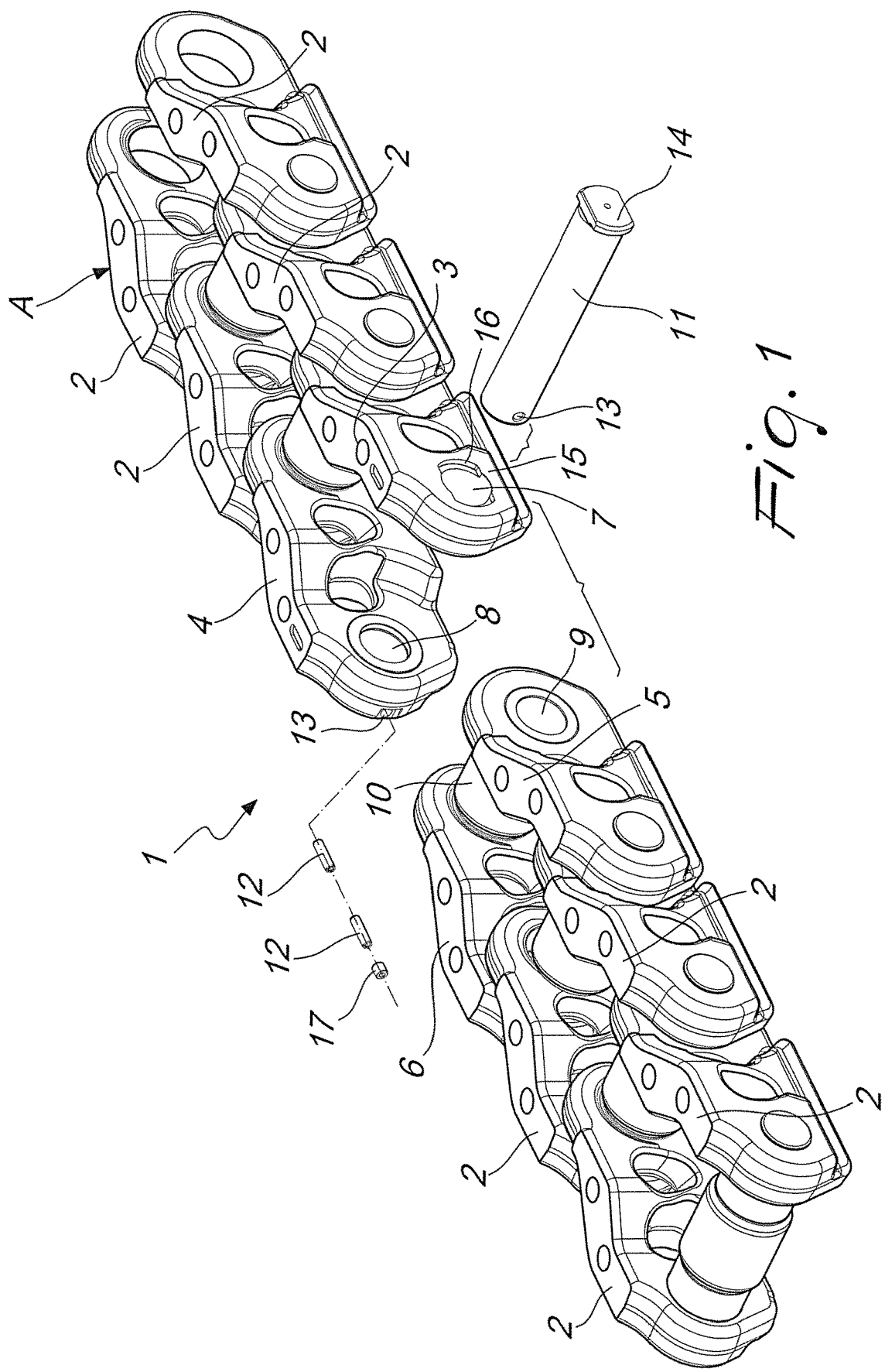
FIG. 1 is an exploded perspective view of a connection assembly for articulated chains according to the invention.
Figure 2:
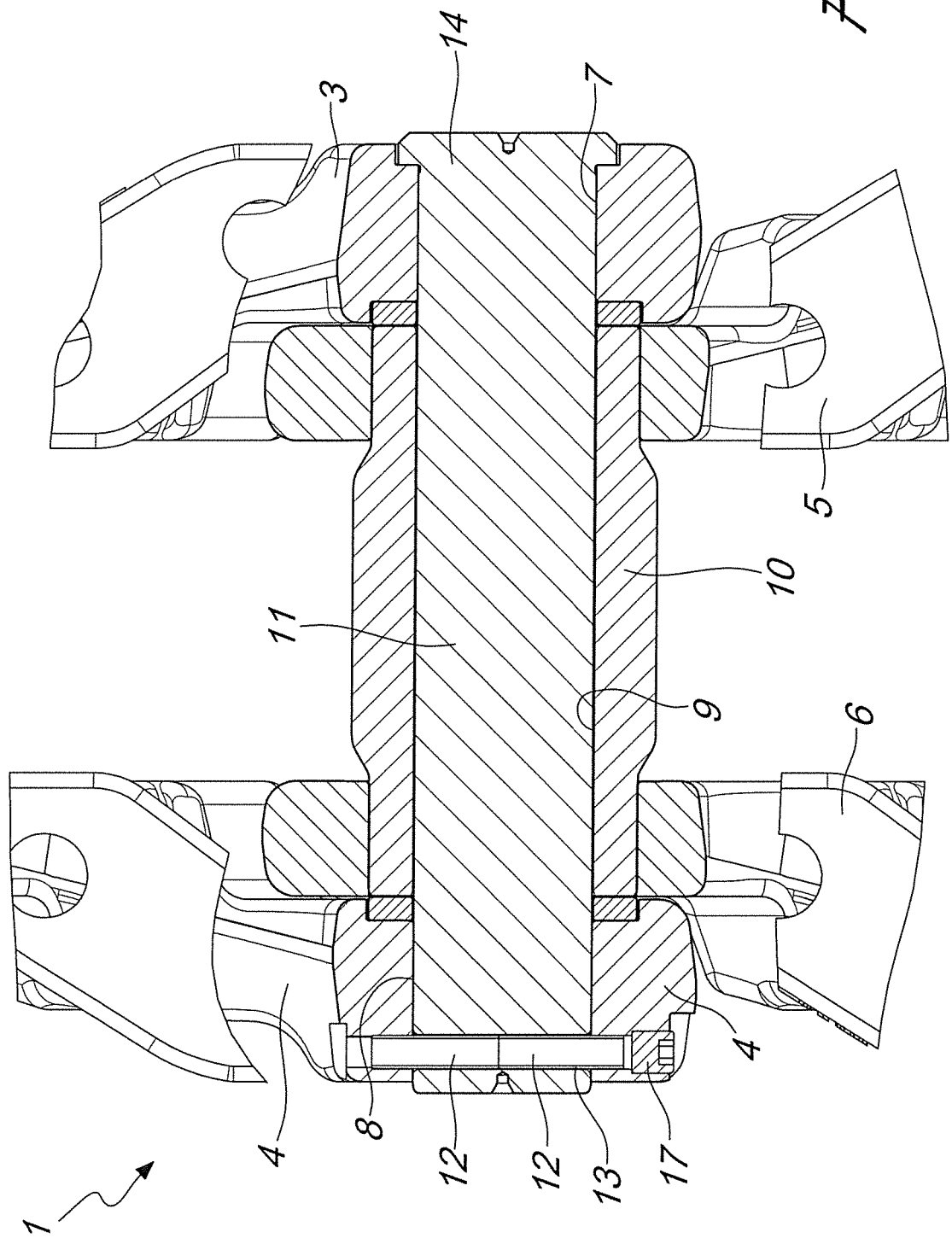
FIG. 2 is a cross-sectional view from above taken along a transverse plane of the assembly in FIG. 1.
Figure 3:
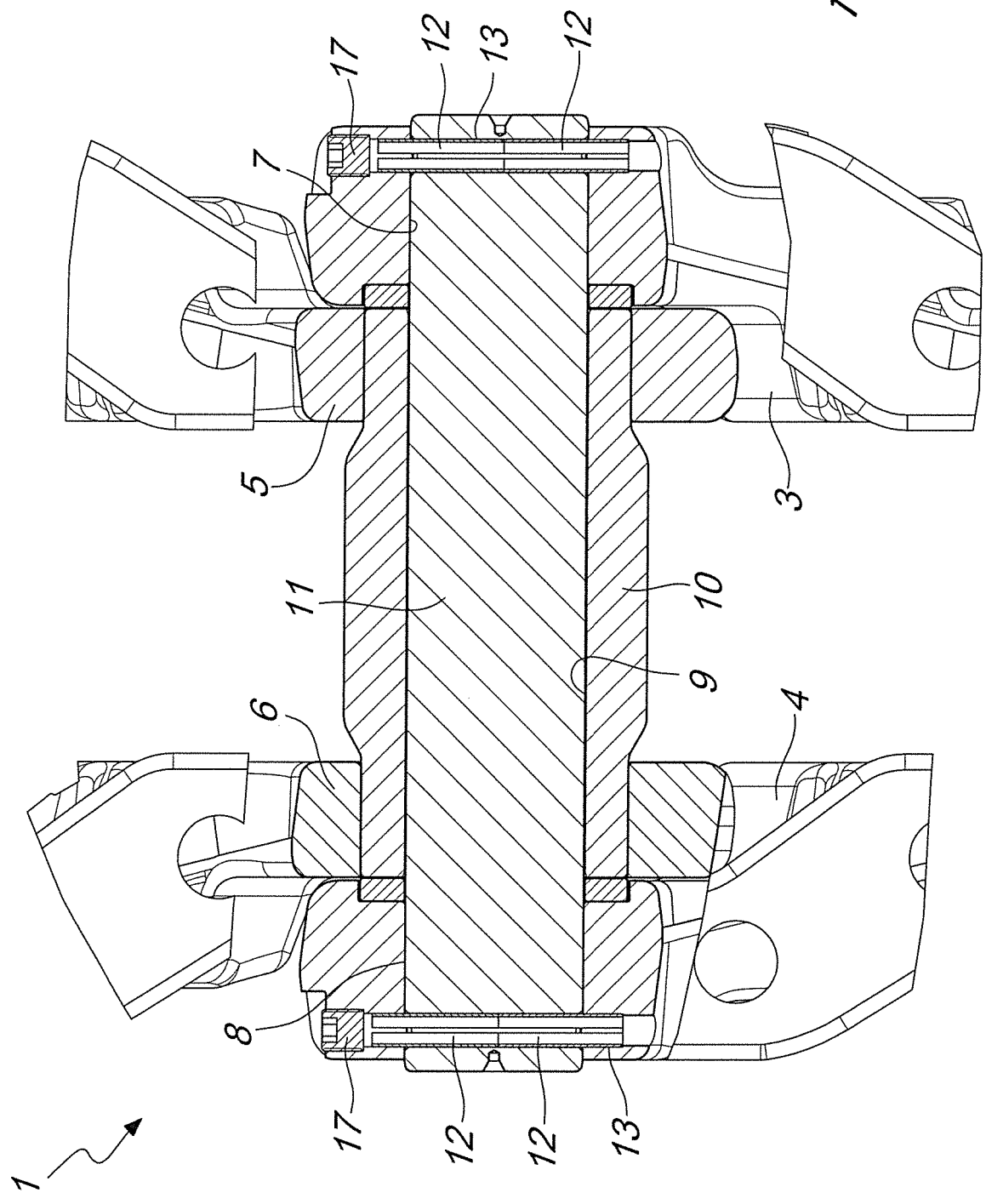
FIG. 3 is a cross-sectional view from above taken along a transverse plane of a possible variation of the connection assembly for articulated chains according to the invention.

With particular reference to the figures, the reference numeral 1 generally designates a connection assembly for articulated chains A.

Articulated chains A comprise mutually-pivoted links 2 that are split between at least one initial link 3, 4 (a half-link 3 and a half-link 4) and at least one terminal link 5, 6 (a half-link 5 and a half-link 6).

In this discussion, what will be called a "link" 3, 4 or 5, 6 is in the jargon of the sector usually called a "chain joint": it has been considered preferable to use a generic technical term instead of a sector jargon term for better ease of interpretation by readers who may not be experts in that sector. For the purposes of this discussion, therefore, the term "link" referring to the set of components 3 and 4 or 5 and 6 is to be considered substantially equivalent to the term "chain joint".

The initial and terminal links 3, 4 and 5, 6 of the assembly 1 according to the invention comprise transverse holes 7, 8, 9 (in particular the hole 7 in the half-link 3, the hole 8 in the half-link 4, the hole 9 in a bushing 10 which in turn is accommodated in the half-link 5 and in the half-link 6), which are arranged in mutual alignment when the links 3, 4 and 5, 6 are in the mutual coupling configuration.

The assembly 1 further comprises a master pin 11, with shape and dimensions substantially complementary to those of the holes 7, 8, 9 and adapted to be inserted into and accommodated in such holes 7, 8, 9 in order to couple the links 3, 4, 5, 6.

The connection assembly 1 comprises, finally, at least one elastic peg 12 that can be accommodated, with elastic forcing thereof, in at least one respective radial channel 13 which is defined, in its outermost parts, on at least one link (in particular on the half-link 3) chosen from between the initial link 3, 4 and the terminal link 5, 6 and, in its innermost part, on the master pin 11.

According to a particular embodiment of undoubted applicative interest, the pin 11 can profitably comprise a contoured head 14 which protrudes with respect to the shank of that pin 11.

In such case, at least one face 15 of the corresponding link 3, proximate to the respective hole 7 for accommodating the pin 11, will conveniently comprise an aperture 16 with shape and dimensions complementary to those of the head 14 of the pin 11.

In the assembled configuration, the head 14 of the pin 11 will be accommodated with a minimal play in the aperture 16, thus preventing possible unwanted rotations of the pin 11 with respect to the half-link 3.

In the case shown in FIG. 1, the contoured head 14 presents a protrusion from the shape of the shank of the pin 11, which is provided according to a predefined direction. The possibility is not ruled out of providing polygonal contoured heads or heads with specific shapes that make it possible to reduce to the minimum the play with the respective aperture 16 of the face 15 of the corresponding half-link 3.

Obviously the play between the head 14 and the aperture 16 can never be completely eliminated since it is necessary to ensure easy access of the head 14 to the aperture 16 in the assembly step (by specifying a suitable dimensioning).

Any movements that can be ascribed to such play (between the head 14 and the aperture 16) will in any case be guarded against by virtue of the elastic behavior of the elastic peg 12 inserted into the channel 13.

With particular reference to an embodiment of undoubted applicative interest and as an alternative to the embodiment described above, the radial channels 13 can conveniently be at least two in number: a first channel will in such case be defined, in its outermost parts, on at least one link chosen from between the right initial half-link 3 and the right terminal half-link 5 and, in in its innermost part, on an initial end of the master pin 11, and a second channel will instead be defined, in its outermost parts, on at least one link chosen from between the left initial half-link 4 and the left terminal half-link 6 and, in its innermost part, on the terminal end of the master pin 11.

Clearly, each channel of this particular version will accommodate at least one respective elastic peg 12.

It is relevant to note that at least one portion of the at least one channel (for example the channel 13) provided on a respective link (following the example on the half-link 4) is open outward, in order to allow the insertion of the elastic peg 12 in the assembly step.

Positively at least one outwardly-open portion of the at least one channel (for example of the channel 13) can accommodate a closure stopper.

In particular, at least one outwardly-open portion of the at least one channel (for example of the channel 13) can positively be threaded, in order to accommodate a threaded closing element such as a screw, a threaded grub screw 17 and the like.

It should furthermore be noted that the diameters of the transverse holes 7, 8, 9 of the initial link (half-link 3 and half-link 4) and of the terminal link (half-link 5 and half-link 6) have a diameter equal to the diameter of the pin 11 plus, indicatively, 0.005-0.1 mm. Usually there will be a play of the order of a few hundredths of a millimeter.

From an implementation point of view, it is necessary to highlight that the portion of the channel 13 which is defined on the pin 11 has a predefined angular inclination with respect to the contoured head 14 of that pin, for the correct alignment with the corresponding external portions of the channel 13 which are defined in a link (for example the half-link 4) upon the full insertion of the pin 11 into the holes 7, 8, 9 of the links 3, 4, 5, 6 (and of the bushing 10).

It should be noted that the mutually-pivoted links 2 can also be affected by at least two splits, each one defined between at least one respective initial link 3, 4 and at least one respective terminal link 5, 6.

In this case, at each split there will be respective transverse holes 7, 8, 9 of a respective initial link 3, 4 and of a respective terminal link 5, 6, which are arranged in mutual alignment when such links 3, 4, 5, 6 are in the coupling configuration.

A respective master pin 11, with shape and dimensions substantially complementary to those of the holes 7, 8, 9, will be adapted to be accommodated in such holes 7, 8, 9 in order to couple the respective links 3, 4, 5, 6, and at least one respective elastic peg 12 will be accommodatable, with elastic forcing thereof, in at least one respective radial channel 13 which is defined, in its outermost parts, on at least one respective link chosen from between a respective initial link (for example a half-link 4) and a respective terminal link and, in its innermost part, on the respective master pin 11.

In practice a same chain A of a crawler track can comprise several connection assemblies 1, arranged in its separate parts in order to provide the adapted closed configuration thereof.

Finally it should be noted that the elastic peg 12 is preferably constituted by a substantially cylindrical body which is provided by way of a sheet of steel for springs conveniently rolled to define a shape that is at least partially cylindrical. The peg 12 will therefore tend to assume the diameter corresponding to its inactive configuration, by reacting elastically to any forcing thereof that determines a contraction of its diameter. Such elastic behavior eliminates the axial movements of the pin 11 in the holes 7, 8, 9, thus favoring the stability of the connection and the corresponding lifetime.

Two separate pegs 12 can also be inserted into the channel 13.

Advantageously the present invention solves the above mentioned problems, by providing a connection assembly 1 for articulated chains A that can be easily fitted without necessitating dedicated machines (such as high-power presses and the like). The adoption of elastic pegs 12 and the particular configuration of the components makes it possible in fact for an operator to carry out the assembly in any location exclusively using manual tools.

Conveniently the assembly 1 according to the invention ensures that the axial plays of the couplings are minimized, with consequent reduction of wear.

Advantageously the assembly 1 according to the invention is very low cost.

Conveniently the assembly 1 according to the invention is adapted to be adopted on works vehicles of any kind and used in any environment.

Positively the assembly 1 according to the invention is easily and practically implemented and safe in use.

The invention, thus conceived, is susceptible of numerous modifications and variations, all of which are within the scope of the appended claims. Moreover, all the details may be substituted by other, technically equivalent elements.

For example the channel 13 could also be constituted by an outwardly-open slot (as shown in FIG. 4): in any case the presence of the at least one elastic peg 12, in such version also, will make it possible to eliminate the axial and rotational play of the pin 11 with respect to the half-links 3 and 4, thus reducing the onset of malfunctions and wear.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

Where the technical features mentioned in any claim are followed by reference numerals and/or signs, those reference numerals and/or signs have been included for the sole purpose of increasing the intelligibility of the claims and accordingly, such reference numerals and/or signs do not have any limiting effect on the interpretation of each element identified by way of example by such reference numerals and/or signs.

The invention claimed is:

1. A connection assembly for articulated chains which comprise mutually-pivoted links that are split between at least one initial link and at least one terminal link, wherein the connection assembly comprises:
   transverse holes of said initial link and said terminal link, which are arranged in mutual alignment when said initial and terminal links are in the coupling configuration,
   a master pin, with shape and dimensions substantially complementary to those of said holes and adapted to be inserted into said holes in order to couple said initial and terminal links,
   at least one elastic peg that can be accommodated, with elastic forcing thereof, in at least one respective radial channel which is defined, in its outermost parts, on at least one link chosen from between said initial link and said terminal link and, in its innermost part, on said master pin,
   wherein said radical channels are at least two in number, a first channel being defined, in its outermost parts, on at least one link chosen from between said right initial link and said right terminal link and, in its innermost part, on an initial end of said master pin, a second channel being defined, in its outermost parts, on at least one link chosen from between said left initial link and said left terminal link and, in its innermost part, on a terminal end of said master pin.

2. The connection assembly according to claim 1, wherein said pin comprises a contoured head which protrudes with respect to the shank of said pin, at least one face of said link, proximate to the respective hole for accommodating said pin, comprising an aperture with shape and dimensions complementary to those of said head of said pin for the accommodation of said head.

3. The connection assembly according to claim 1, wherein at least one portion of said at least one channel which is provided on a respective link is open outwardly, in order to allow the insertion of said elastic peg.

4. The connection assembly according to claim 3, wherein said at least one outwardly-open portion of said at least one channel accommodates a closure stopper.

5. The connection assembly according to claim 4, wherein said at least one outwardly-open portion of said at least one channel is threaded, in order to accommodate a threaded closing element.

6. The connection assembly according to claim 1, wherein the diameters of said transverse holes of said initial link and said terminal link have a diameter corresponding to the diameter of said pin increased indicatively by 0.005-0.1 mm.

7. The connection assembly according to claim 2, wherein the portion of said channel which is defined on said pin has a predefined angular inclination with respect to the contoured head of said pin for the correct alignment with the external portions of said channel upon the full insertion of said pin into said holes of said links.

8. The connection assembly according to claim 1, wherein said mutually-pivoted links are affected by at least two splits, each one defined between at least one respective initial link and at least one respective terminal link, at each split there being respective transverse holes of said respective initial link and said respective terminal link, which are arranged in mutual alignment when said initial and terminal links are in the coupling configuration, a master pin, with shape and dimensions substantially complementary to those of said holes and adapted to be inserted into said holes in order to couple said respective initial and terminal links, and at least one elastic peg that can be accommodated, with elastic forcing thereof, in at least one respective radial channel which is defined, in its outermost parts, on at least one respective link chosen from between said respective initial link and said respective terminal link and, in its innermost part, on said master pin.

9. The connection assembly according to claim 1, wherein said elastic peg is of the type of a substantially cylindrical body constituted by a sheet of steel for springs conveniently rolled to define a shape that is at least partially cylindrical.

10. A connection assembly for articulated chains which comprise mutually-pivoted links that are split between at least one initial link and at least one terminal link, wherein the connection assembly comprises:
   transverse holes of said initial link and said terminal link, which are arranged in mutual alignment when said initial and terminal links are in the coupling configuration,
   a master pin, with shape and dimensions substantially complementary to those of said holes and adapted to be inserted into said holes in order to couple said initial and terminal links,
   at least one elastic peg that can be accommodated, with elastic forcing thereof, in at least one respective radial channel which is defined, in its outermost parts, on at least one link chosen from between said initial link and said terminal link and, in its innermost part, on said master pin;
   wherein at least one portion of said at least one channel which is provided on a respective link is open outwardly, in order to allow the insertion of said elastic peg; and
   wherein said at least one outwardly-open portion of said at least one channel accommodates a closure stopper.

11. The connection assembly according to claim 10, wherein said at least one outwardly-open portion of said at least one channel is threaded, in order to accommodate a threaded closing element.

12. The connection assembly according to claim 11, wherein the threaded closing element is a screw or a threaded grub screw.

13. A connection assembly for articulated chains which comprise mutually-pivoted links that are split between at least one initial link and at least one terminal link, wherein the connection assembly comprises:
   transverse holes of said initial link and said terminal link, which are arranged in mutual alignment when said initial and terminal links are in the coupling configuration,
   a master pin, with shape and dimensions substantially complementary to those of said holes and adapted to be inserted into said holes in order to couple said initial and terminal links,
   at least one elastic peg that can be accommodated, with elastic forcing thereof, in at least one respective radial channel which is defined, in its outermost parts, on at least one link chosen from between said initial link and said terminal link and, in its innermost part, on said master pin,
   wherein the innermost part of said channel has a predefined angular inclination with respect to a contoured head of said pin for the correct alignment with the outermost parts of said channel upon the full insertion of said pin into said holes of said links.

\* \* \* \* \*